United States Patent
Chencinski et al.

(10) Patent No.: US 10,552,054 B2
(45) Date of Patent: Feb. 4, 2020

(54) PERIPHERAL COMPONENT INTERCONNECT EXPRESS (PCIE) NETWORK WITH INPUT/OUTPUT (I/O) CHAINING TO REDUCE COMMUNICATION TIME WITHIN EXECUTION OF I/O CHANNEL OPERATIONS

(71) Applicant: INTERNATIONAL BUSINESS MACHINES CORPORATION, Armonk, NY (US)

(72) Inventors: Edward W. Chencinski, Poughkeepsie, NY (US); Bruce Ratcliff, Red Hook, NY (US); Eric N. Lais, Georgetown, TX (US); Michael James Becht, Poughkeepsie, NY (US); Matthias Klein, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/025,448

(22) Filed: Jul. 2, 2018

(65) Prior Publication Data
US 2020/0004433 A1 Jan. 2, 2020

(51) Int. Cl.
G06F 3/00 (2006.01)
G06F 3/06 (2006.01)
G06F 13/16 (2006.01)
G06F 13/42 (2006.01)

(52) U.S. Cl.
CPC .......... *G06F 3/0613* (2013.01); *G06F 3/0659* (2013.01); *G06F 3/0673* (2013.01); *G06F 13/1605* (2013.01); *G06F 13/4282* (2013.01); *G06F 2213/0026* (2013.01)

(58) Field of Classification Search
CPC ...................................................... G06F 3/0613
See application file for complete search history.

(56) References Cited

U.S. PATENT DOCUMENTS

| 5,561,809 | A | 10/1996 | Elko et al. | |
|---|---|---|---|---|
| 7,287,114 | B2 * | 10/2007 | Sullivan | G06F 13/102 703/21 |
| 7,469,305 | B2 * | 12/2008 | Mirabeau | G06F 13/28 710/22 |
| 8,738,860 | B1 | 5/2014 | Griffin et al. | |
| 9,858,190 | B2 * | 1/2018 | Ambroladze | G06F 12/0855 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Tammara R Peyton
(74) *Attorney, Agent, or Firm* — Steven Chiu, Esq.; Blanche E. Schiller, Esq.; Heslin Rothenberg Farley & Mesiti P.C.

(57) ABSTRACT

A set of memory access operations is obtained. The set of memory access operations includes a plurality of memory access operations to be chained, in which the plurality of memory access operations are to be processed as an atomic unit. The plurality of memory access operations are executed in a particular order, and one or more results are provided.

19 Claims, 14 Drawing Sheets

(56) References Cited

U.S. PATENT DOCUMENTS

2015/0212966 A1 7/2015 Anderson
2016/0140069 A1 5/2016 Harriman et al.

OTHER PUBLICATIONS

IBM, "z/Architecture—Principles of Operation," IBM Publication No. SA22-7832-10, Eleventh Edition, Mar. 2015, pp. 1-1732.
Intel, "Thunderbolt Technology," 2012 (no further date information available), pp. 1-3.
Altera/Intel, "PCI Express High Performance Reference Design," Apr. 20, 2017, pp. 1-22.
Anonymous, "Multi-Mode PCIE Interface with Busy Contention Handling," IPCOM000248763D, Jan. 2017, pp. 1-2 (+ cover).
Anonymous, "Single Root Input/Output Virtualization (SR-IOV) Based Function Slice Accelerator With Direct Memory Transfer," IPCOM000250070D, May 2017, pp. 1-14 (+ cover).
Anonymous, "Software Defined Network Adapter/Network Interface Controller for Increased Throughput and Processor Offloading," May 2016, pp. 1-6 (+ cover).

* cited by examiner

PERIPHERAL COMPONENT INTERCONNECT EXPRESS (PCIE) NETWORK WITH INPUT/OUTPUT (I/O) CHAINING TO REDUCE COMMUNICATION TIME WITHIN EXECUTION OF I/O CHANNEL OPERATIONS

BACKGROUND

One or more aspects relate, in general, to input/output (I/O) communications, and in particular, to processing of input/output operations transmitted via input/output communication devices.

One example of input/output communication devices are channels. Channels may be implemented in cards that connect to a computing system via one or more I/O links. For instance, IBM Z, offered by International Business Machines Corporation, Armonk, N.Y., provide channels that are implemented in cards that connect to an IBM Z Central Electronics Complex (CEC) via a Peripheral Component Interconnect express (PCIe) link, as examples. These channels are used to access main memory within the Central Electronics Complex.

The access path to/from main memory for channels providing extended connectivity to storage and local area networks typically crosses many components. Each component crossing results in additional latency for memory accesses flowing to/from these types of devices.

When an I/O operation is performed, it often involves strings of individual single memory accesses which are to be processed in strict sequence relative to one another. In many cases, the external I/O device (e.g., channel) is to wait for the completion of each memory access before initiating the next. When such strings of serialized memory accesses are to be executed for a single I/O operation, the overall latency for the sequence of round trips between the channel and memory can add significant latency to the I/O operation.

SUMMARY

Shortcomings of the prior art are overcome and additional advantages are provided through the provision of a computer system for facilitating processing within a computing environment. The computer system includes a memory, and a memory controller in communication with the memory. The computer system is configured to perform a method. The method includes obtaining, by the memory controller from an input/output (I/O) device coupled to the memory controller via an I/O network, a set of memory access operations. The set of memory access operations includes a plurality of memory access operations to be chained, in which the plurality of memory access operations are received as a group and are to be processed as an atomic unit. The plurality of memory access operations are executed in a particular order, and one or more results of the set of memory access operations are provided.

Computer-implemented methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to improve input/output (I/O) processing, and therefore, system performance. In one aspect, the capability includes I/O operation chaining, in which a plurality of memory accesses (e.g., of an I/O operation) are chained to reduce communications time within execution of I/O operations. In one example, the chaining is used with a communications protocol, such as a tunneled communications protocol, an example of which is offered by International Business Machines Corporation, Armonk, N.Y. The tunneled protocol allows direct memory access (DMA) stores to flow to memory without specific ordering rules, providing throughout performance advantages. Although the tunneled protocol may not have specific ordering rules, there may be architectural requirements that specific individual stores are to be executed in order to ensure data integrity. In such a scenario, the protocol specifies that the stores are to be executed one at a time, waiting for the tunneled response to return for each store in a sequence before initiating the subsequent store. However, in accordance with an aspect of the present invention, the performance advantages of the tunneled protocol and similar protocols are extended by chaining ordered sets of memory access operations used within, e.g., the tunneled protocol, in which ordering locally within a set of chained operations is enforced without incurring the disadvantage of ordering all stores.

Figure 1A:
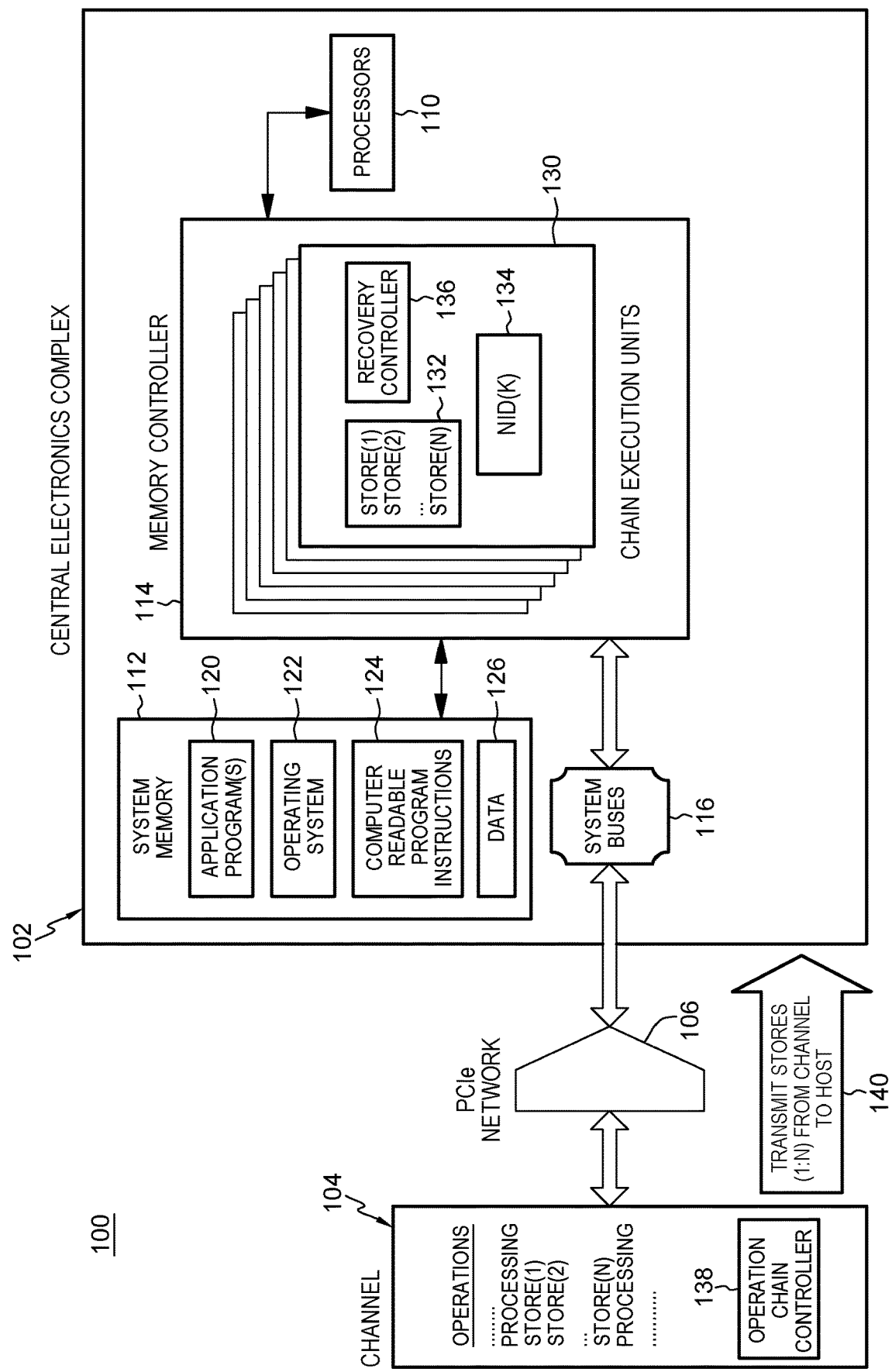
FIGS. 1A-1C depict one example of a computing environment to incorporate and use one or more aspects of the present invention, as well as one example of processing associated with chained I/O operations, in accordance with an aspect of the present invention.

One embodiment of a computing environment to incorporate and use one or more aspects of the present invention is described with reference to FIG. 1A. In one example, computing environment 100 includes a Central Electronics Complex 102 coupled to one or more I/O devices, such as channels 104, via a network 106. As examples, channels 104 are Open Systems Adapters (OSA) providing local area network (LAN) connectivity, and network 106 is a Peripheral Component Interconnect express (PCIe) network; however, other types of I/O devices, channels and/or networks are possible. In one example, the tunneled communications protocol is defined over PCIe and used in processing memory access operations that travel between, e.g., a root complex of PCIe to system memory within the Central Electronics Complex.

Central Electronics Complex 102 is, for instance, an IBM Z Central Electronics Complex based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Central Electronics Complex 102 includes, for instance, one or more processors 110 coupled to system memory 112 (a.k.a., memory, main memory, main storage, central storage) via a memory controller 114. Memory controller 114 is also coupled to PCIe network 106 via one or more system buses 116.

Memory controller 114 includes, in accordance with an aspect of the present invention, one or more chain execution units 130 to process chained operations, as described herein. In one example, a chain execution unit 130 includes a buffer 132 to queue memory access operations (e.g., store operations) received from a channel to be processed; a node identifier (NID) 134 to identify a set of chained operations; and a recovery controller 136 to be used for recovery, if needed or desired. In one example, chain execution unit 130 is implemented as hardware; however, in other examples, it may be implemented as software, firmware and/or a combination of software, firmware and/or hardware.

Memory 112 may include, for instance, one or more programs or applications 120, an operating system 122 (e.g., z/OS), one or more computer readable program instructions 124, and/or data 126. Computer readable program instructions 124 may be configured to carry out functions of embodiments of aspects of the invention.

Computer Electronics Complex 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with Computer Electronics Complex 102. Examples, include, but are not limited to: microcode, device drivers, redundant processing units, external disk drive arrays, RAID systems, tape drives, and data archival storage systems, etc.

Computer Electronics Complex 102 may be operational with numerous other general purpose or special purpose computing system environments or configurations. Examples of well-known computing systems, environments, and/or configurations that may be suitable for use with Computer Electronics Complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Data to be stored in system memory 112 is transmitted from channel 104 over network 106 to memory controller 114. Memory controller 114 performs the store operations and provides results (e.g., status) back to channel 104 via network 106. To increase efficiency in performing the store operations (or other memory access operations), in accordance with an aspect of the present invention, channel 104 transmits sets of chained operations to the memory controller to be processed, as a group. Multiple memory access operations may be transmitted, as a group, without waiting for a response from an individual memory access operation, increasing efficiency and performance. In one example, each group or set of chained operations is processed as an atomic unit, in which the group of chained operations is not considered complete until, e.g., all of the operations in the group successfully execute (e.g., without taking an exception or otherwise considered complete). If, for instance, an operation of the group takes an exception, chaining breaks and that operation and subsequent operations are individually processed until, e.g., all operations of the group are considered complete (preserving the atomic unit). Subsequent to the group being considered complete, additional processing of the results of the operations of the group and/or other groups may be processed.

In one example, an operation chain controller 138 of channel 104 may be used to control the transmitting of chained operations and receiving responses thereto. Operation chain controller 138 is implemented, in one example, as a hardware component; however, in other examples, it may be implemented as software, firmware and/or a combination of software, firmware and/or hardware.

One embodiment of processing chained operations is described with reference to FIGS. 1A-1C. Referring initially to FIG. 1A, 1 to N (1:N) store operations (or other memory access operations) are transmitted 140 from a channel (e.g., operation chain controller 138 of channel 104) or other I/O device, as a group, to a component within the Central Electronics Complex, such as a memory controller (e.g., memory controller 114). In one aspect, to alleviate the latency of multiple memory accesses employed for a single I/O operation, multiple memory accesses (of, e.g., the I/O operation) may be transmitted as a group or a set, which includes a particular order of operation for those accesses within the set. Further, multiple I/O operations may be simultaneously initiated, each specifying ordering in a nature which is encoded in, e.g., a hardware component (e.g., a chain execution unit) residing much closer to system memory than the channel that is initiating the memory accesses. This enables the channel to initiate multiple sets of chained, but otherwise independent memory accesses, avoiding the time lost waiting for the completion responses of one access at a time before initiating the next access.

In one example, to indicate the multiple memory accesses are to be chained (e.g., considered as part of a set in a particular order), an indicator (e.g., one or more bits in a PCIe header accompanying the transmission of memory accesses) is set (e.g., to one) to communicate the intent to chain the memory accesses.

Figure 1B:
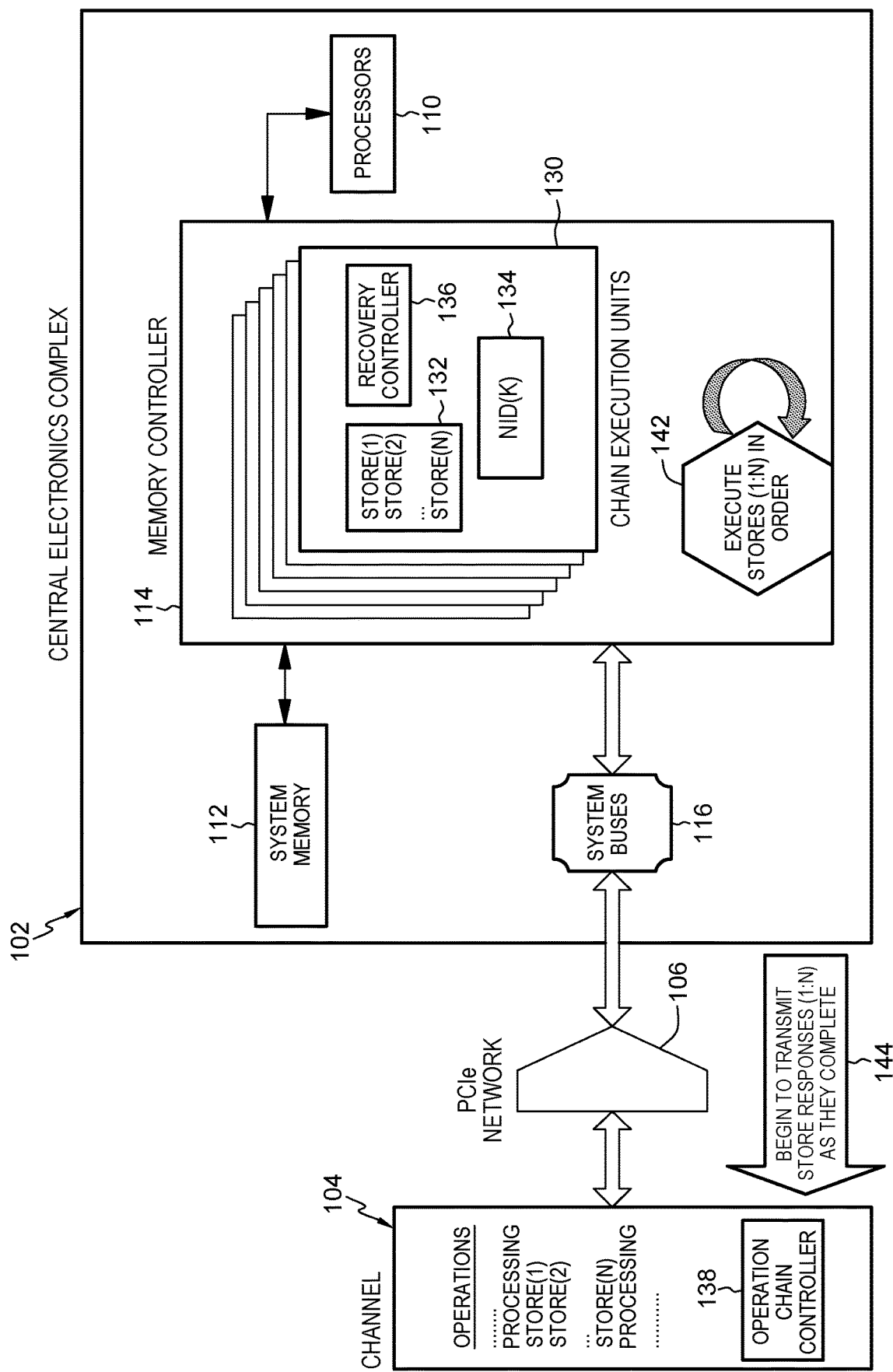

Referring to FIG. 1B, based on the memory controller obtaining (e.g., receiving, being provided, retrieving, etc.) the set of memory accesses of an I/O operation, a selected chain execution unit 130 of the memory controller executes 142 each memory access operation in sequence. The sequencing is within the set of memory accesses, and not between sets, in one example. To perform the memory access operation, in one example, the chain execution unit performs a store operation to store data in system memory 112. As a store is complete, in one example, the chain execution unit sends back 144 results (e.g., completion status) of the individual operation to the I/O device (e.g., channel 104) initiating the I/O operation. This is sent via, for instance, network 106. In one example, operation chain controller 138 of the initiating channel receives the results.

Figure 1C:
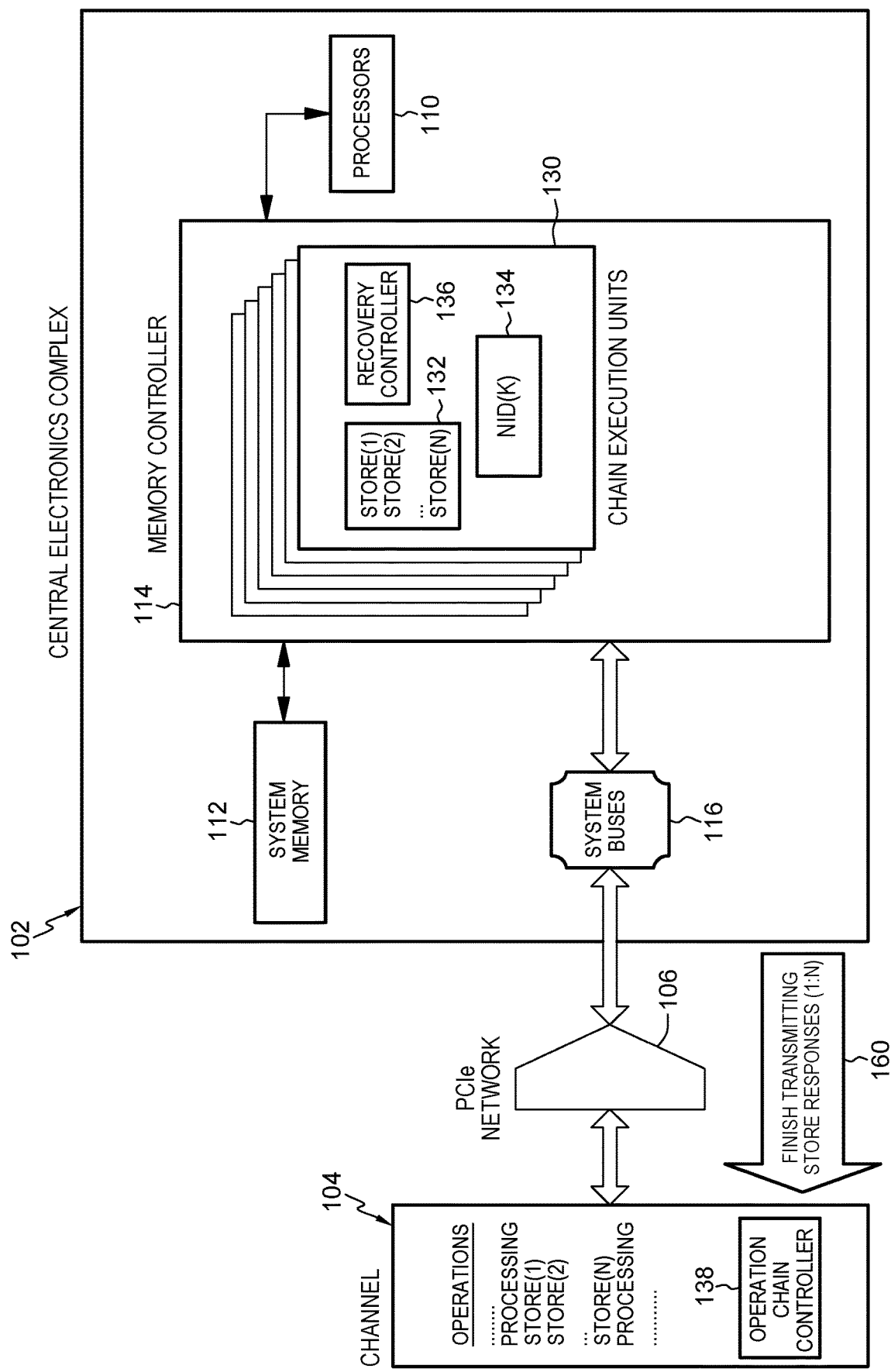

As shown in FIG. 1C, transmission 160 of the results continues via, e.g., network 106 until complete. The results from the multiple chained system memory access operations incur, e.g., the transport latency of close to just a single operation's round trip to the system memory controller. When the channel (e.g., operation chain controller 138) receives the responses for all the stores in the group (e.g., 1 to N), the channel can perform other work using those results and/or continue to send additional groups of operations. In one embodiment, the results may be coalesced until all the memory accesses of the set are performed, and then one result is returned to the channel. Many variations exist.

Figure 2A:
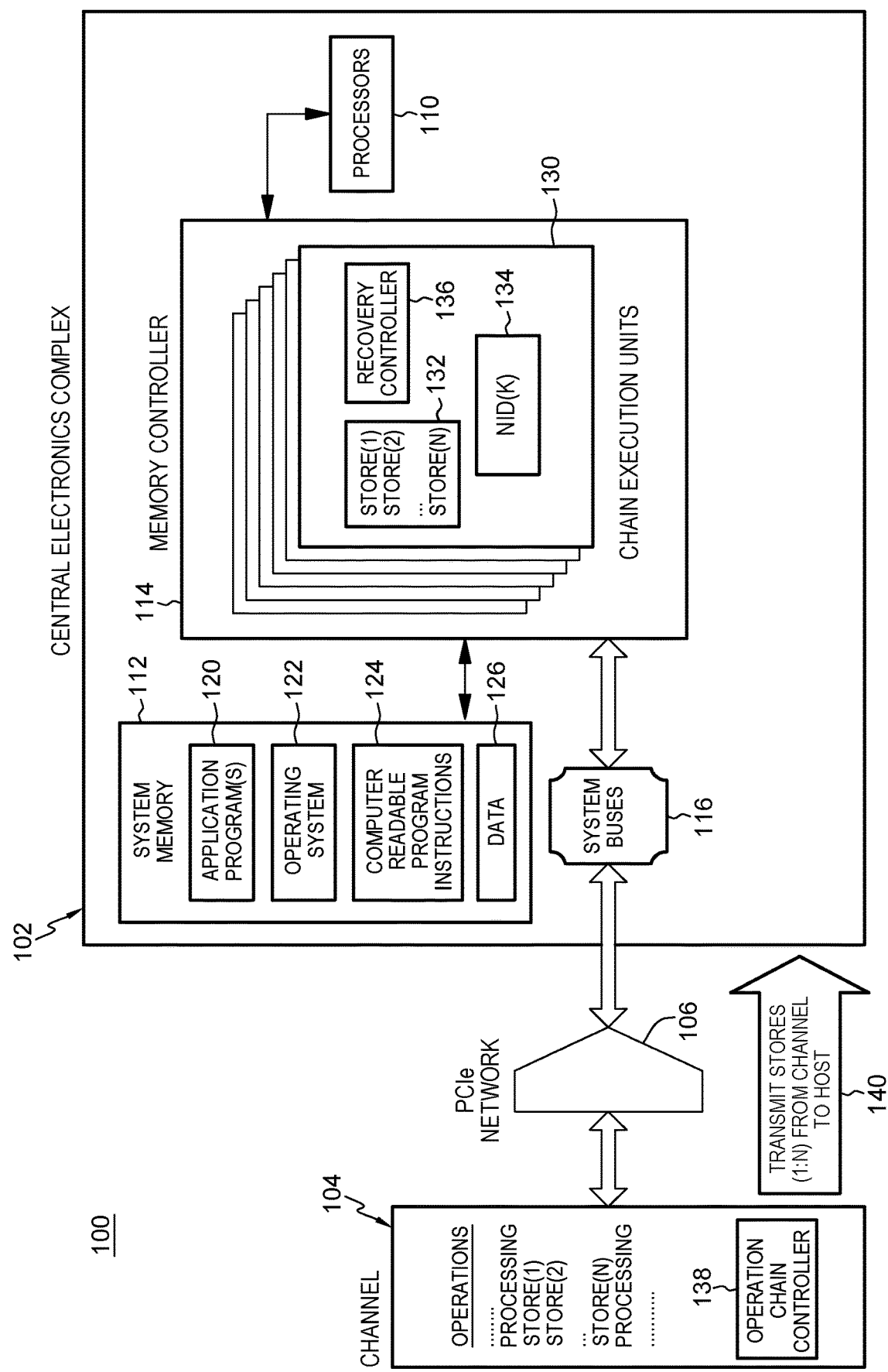
FIGS. 2A-2D depict one example of processing associated with an exception in processing chained I/O operations, in accordance with an aspect of the present invention.

In one aspect, it is possible that one of the store operations takes an exception. An example of this processing is described with reference to FIGS. 2A-2D. Referring, initially, to FIG. 2A, store operations 1 to N (or other memory accesses) are transmitted 140, as a group, from a channel (e.g., channel 104) to a host (e.g., a Central Electronics Complex). For example, the store operations are transmitted from operation chain controller 138 of channel 104 to memory controller 114 via network 106. The stores are buffered in a buffer (e.g., buffer 132) within a chain execution unit 130 of memory controller 114.

Figure 2B:
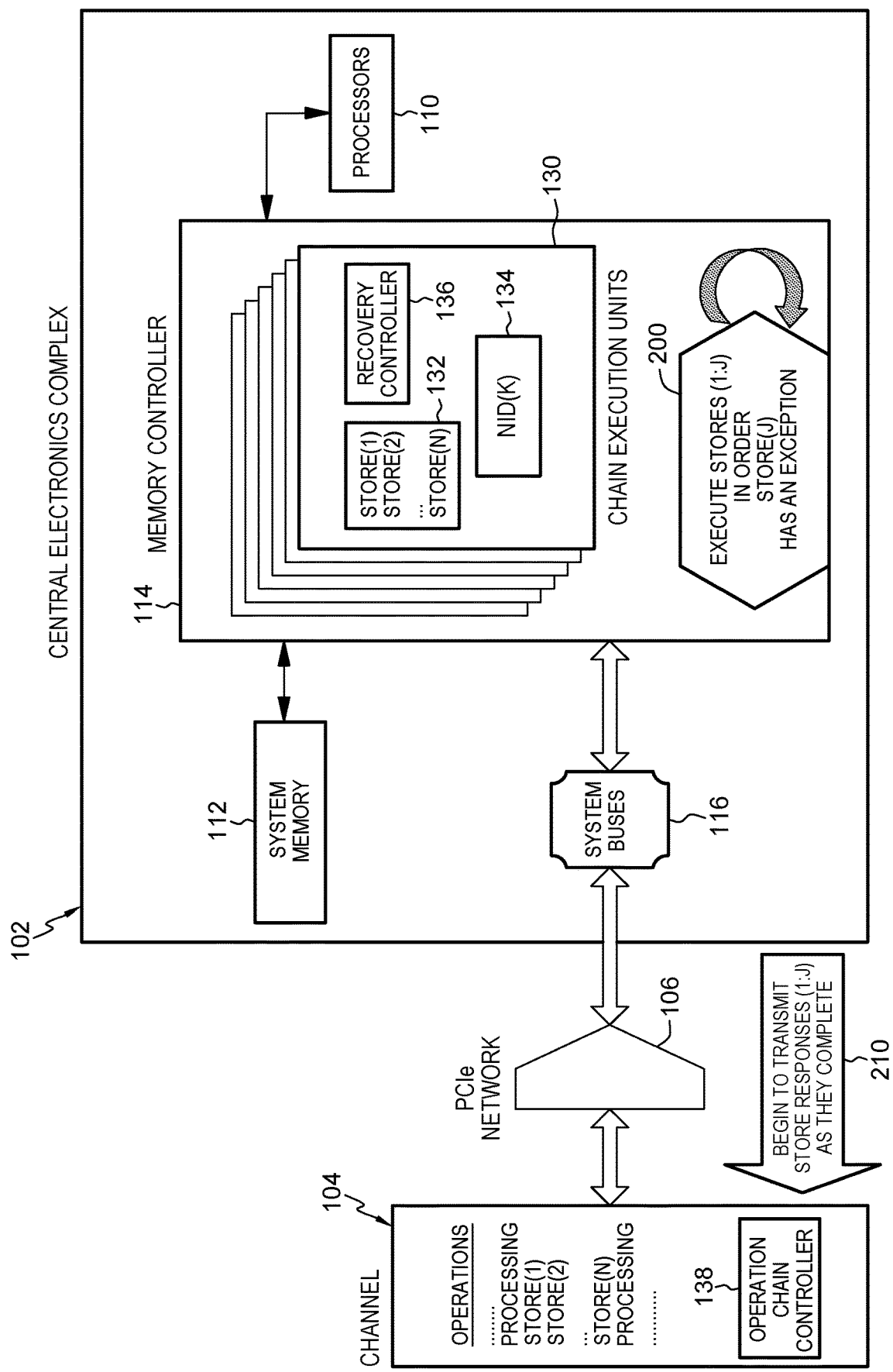

Referring to FIG. 2B, the chain execution unit begins performing the store operations 200, in order, and store J takes an exception. The responses for stores 1 through J are transmitted 210 to the initiating device (e.g., operation chain controller 138 of channel 104) via, e.g., network 106, as they complete.

Figure 2C:
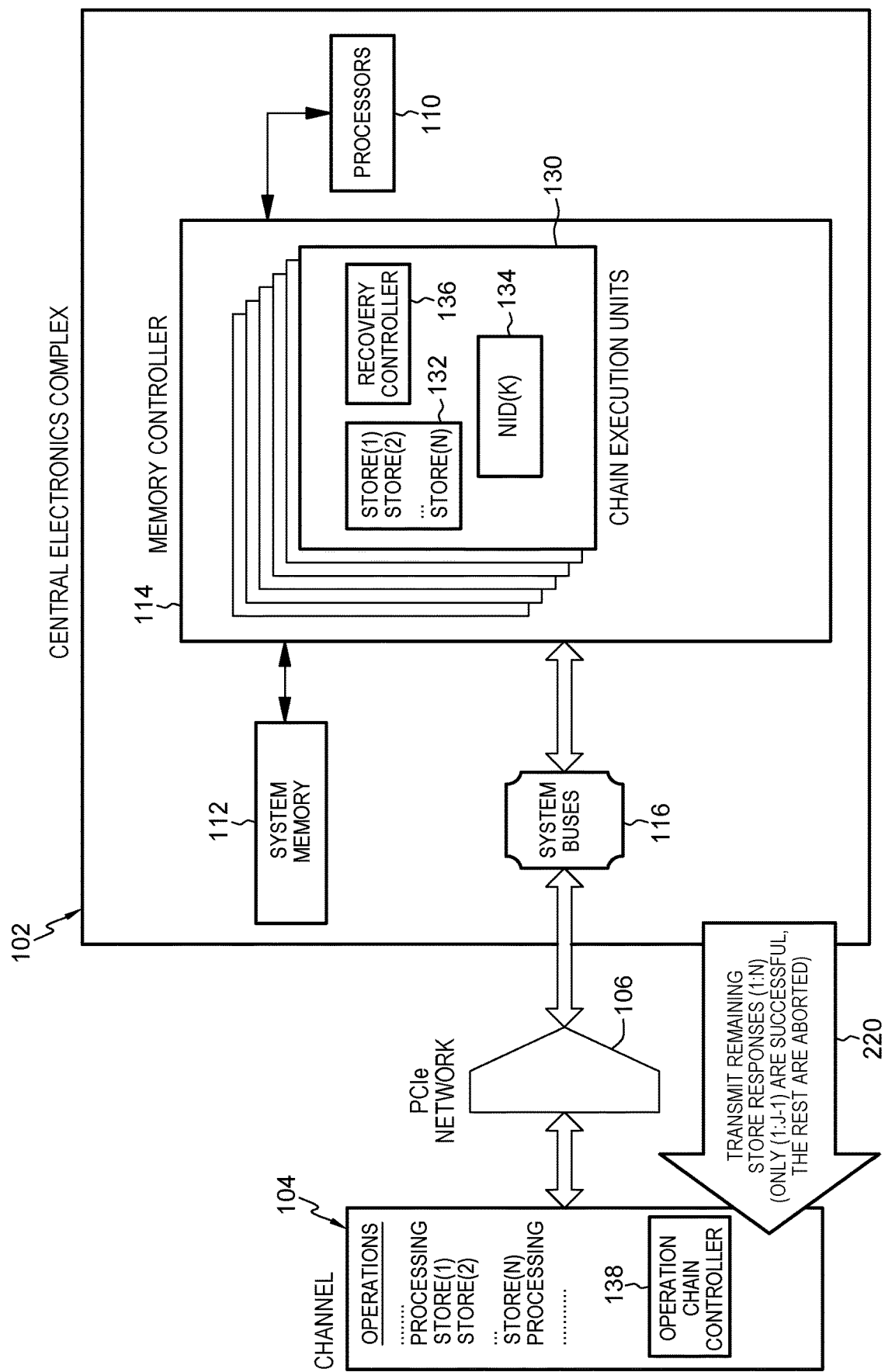
Figure 2D:
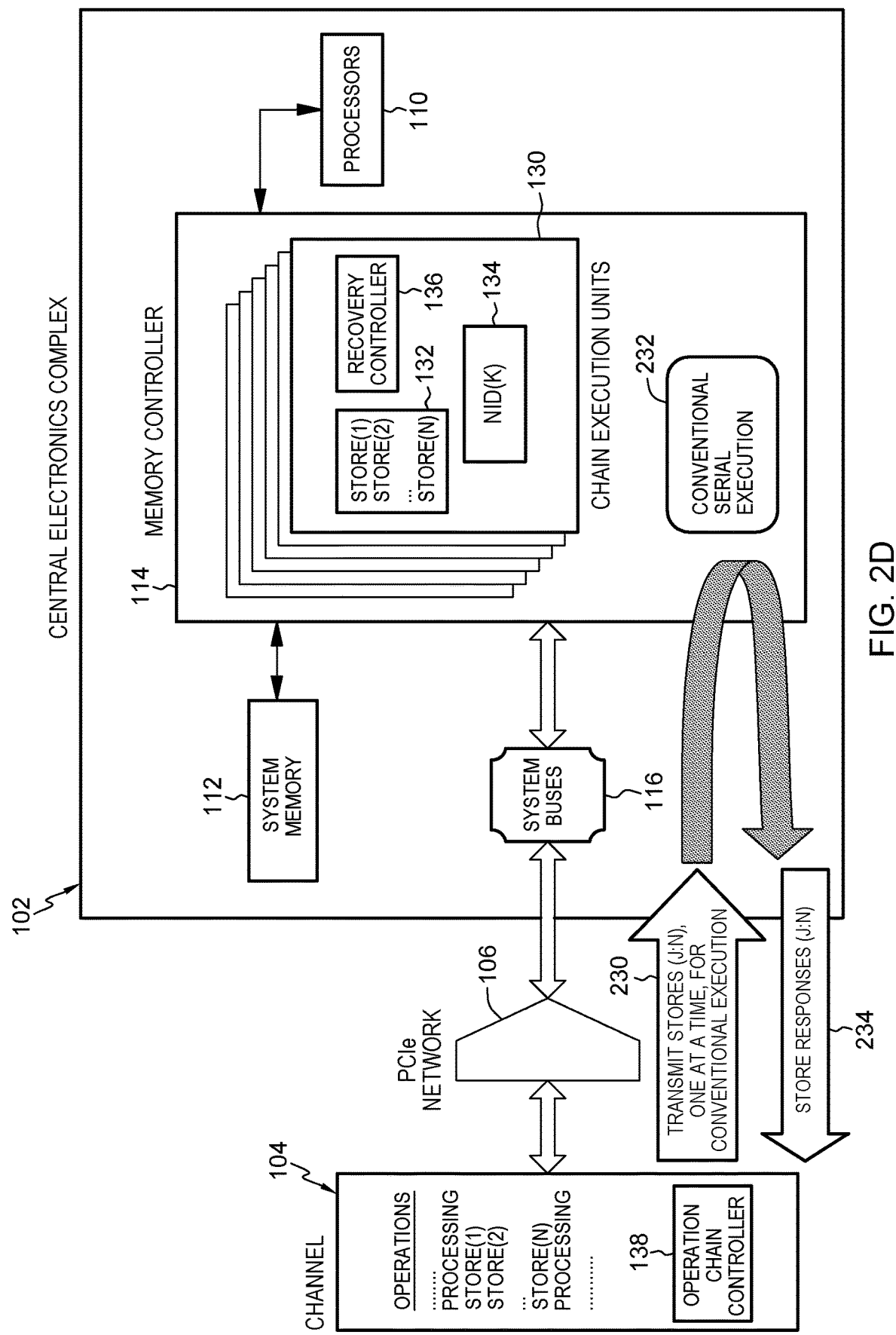

As depicted in FIG. 2C, the remaining store responses are transmitted 220 from memory controller 114 to the initiating channel 104 via, e.g., network 106, but only stores 1 through J-1 are successful; stores J through N are aborted. Therefore, as shown in FIG. 2D, stores J through N are re-transmitted 230, one at a time, from channel 104 (e.g., operation chain controller 138) to memory controller 114 for conventional (i.e., unchained) execution. Each individual store operation is received in the memory controller and serially executed 232. Each response for stores J through N is returned 234 from memory controller 114 to the initiating channel 104. In one embodiment, it is the responsibility of operation chain controller 138 to receive the responses, determine that certain accesses are to be re-transmitted, re-transmit those memory accesses as individual operations, and receive responses for the individual operations. When the responses for stores 1:N are received, the group is considered complete, preserving the atomic unit.

Further, in one example, it is the responsibility of recovery controller 136 to ensure, when an operation fails, that the operations that were chained together execute and complete properly. This means that all of the operations have an associated response. For instance, that the operations that were successfully executed have the success indicated in their individual responses, and the operations that failed or were not executed reflect that in their responses, as well. The recovery controller performs clean up after these operations complete and have sent back the proper responses. The memory is to be left in a state that is consistent with the responses that were sent back to the channel. When the operations that failed to execute are individually resent, the recovery controller is to have left the CEC in a cleaned up state, such that these new separate operations will execute properly; i.e., when the resent individual operations have all individually completed their execution, the contents of the memory are the same as they would have been had the operations all successfully completed as part of the original chain.

Figure 3A:
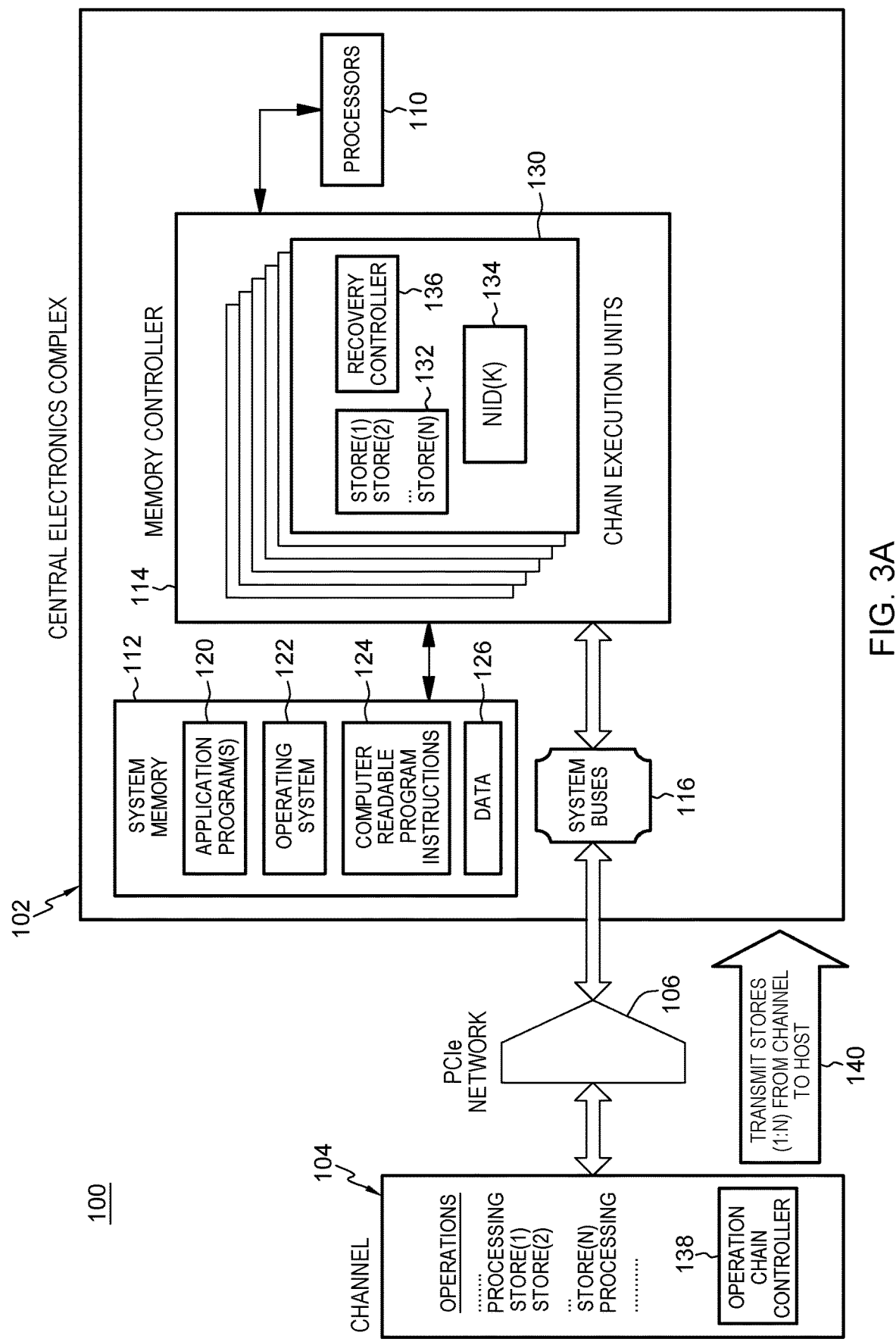
FIGS. 3A-3D depict one example of processing associated with dynamically changing a chained I/O operation to an unchained I/O operation, in accordance with an aspect of the present invention.

In yet a further aspect, processing may dynamically and automatically change from a chained operation to individual operations, as described with reference to FIGS. 3A-3D. Referring initially to FIG. 3A, stores 1 through N are transmitted 140 from a device (e.g., channel 104) to the host (e.g., Central Electronics Complex 102), and in particular, to a memory controller (e.g., memory controller 114) within the host. The memory controller stores the obtained store operations in a buffer (e.g., buffer 132) within a selected chain execution unit 130 of memory controller 114.

Figure 3B:
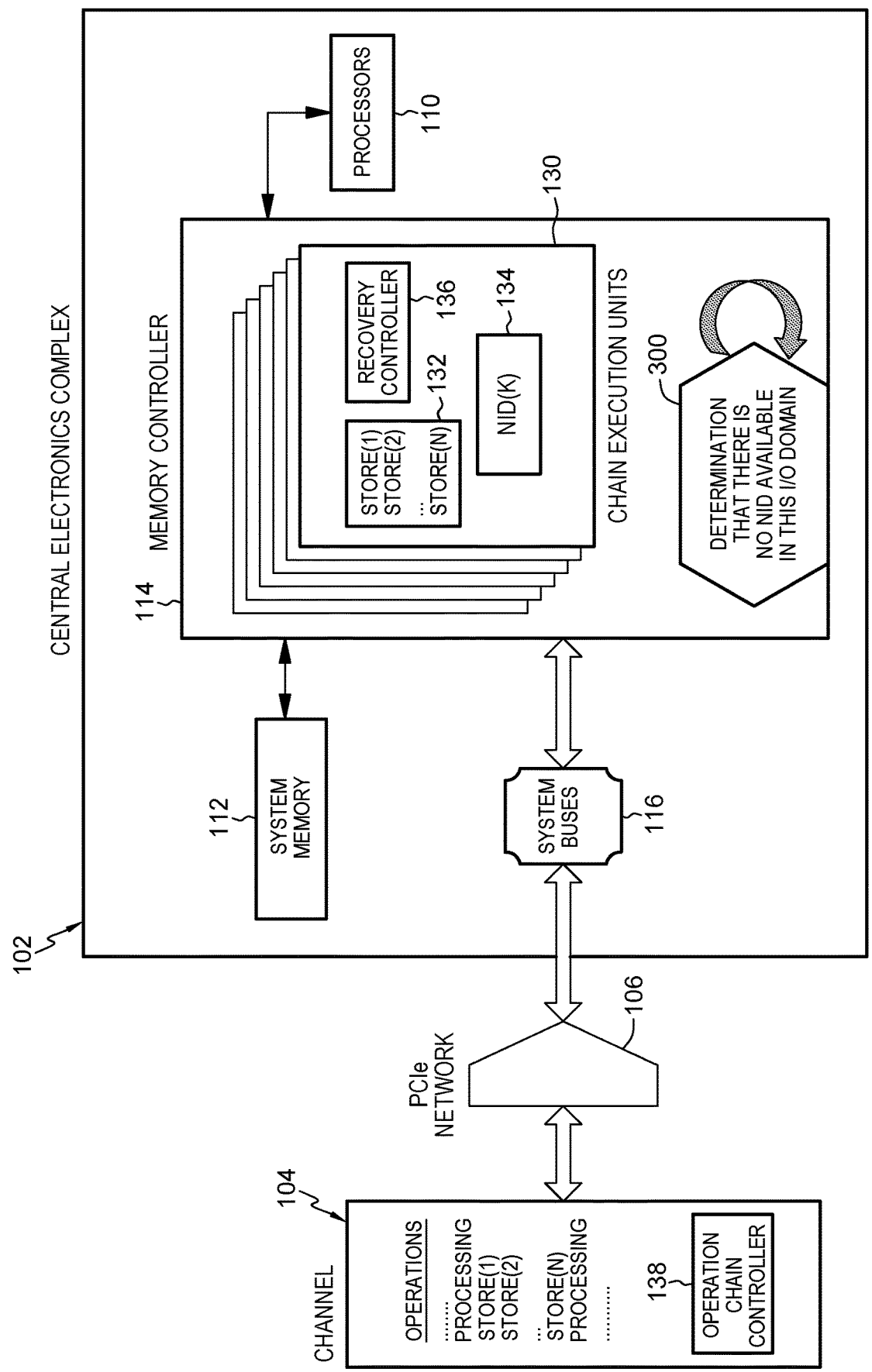

In one embodiment, as shown in FIG. 3B, the selected chain execution unit 130 determines 300 whether there is an available node identifier (NID) (e.g., NID 134) for this I/O domain (e.g., this set of memory accesses). For instance, in one embodiment, based on receiving at least one memory access of a set of memory accesses (e.g., store operations) to be performed for, e.g., an I/O operation, the chain execution unit to perform the memory accesses determines whether there is an available node identifier for the set of memory accesses being transmitted from a channel. In particular, in one embodiment, multiple channel sources for chained operations could be simultaneously active to a single system memory controller. Thus, the system memory controller is to keep the operations from each channel's chain straight and distinct from each other. To keep these separate, each source channel is assigned a node identifier. A node identifier is, in one example, a number that is used for ordering purposes for the host system cache bus traffic that is initiated by the PBU (PCIe Bridge Unit) in, for instance, a z processor. Requests and responses with the same NID follow a strict set of ordering rules. Traffic with different NIDs are not ordered relative to each other. In addition, the PBU can freeze a particular NID, so that traffic to/from that NID is rejected without affecting traffic from other NIDs.

In one embodiment, if the maximum allowable number of NIDs in a PCIe link are exceeded, then any new memory accesses that attempt to be chained are rejected and will come back as a series of conventional unchained accesses. The system memory controller has, in one implementation, state machines capable of tracking each possible simultaneous chained operation set. These state machines keep track of the execution of the chained system memory accesses while they are resident in the system memory controller.

Figure 3C:
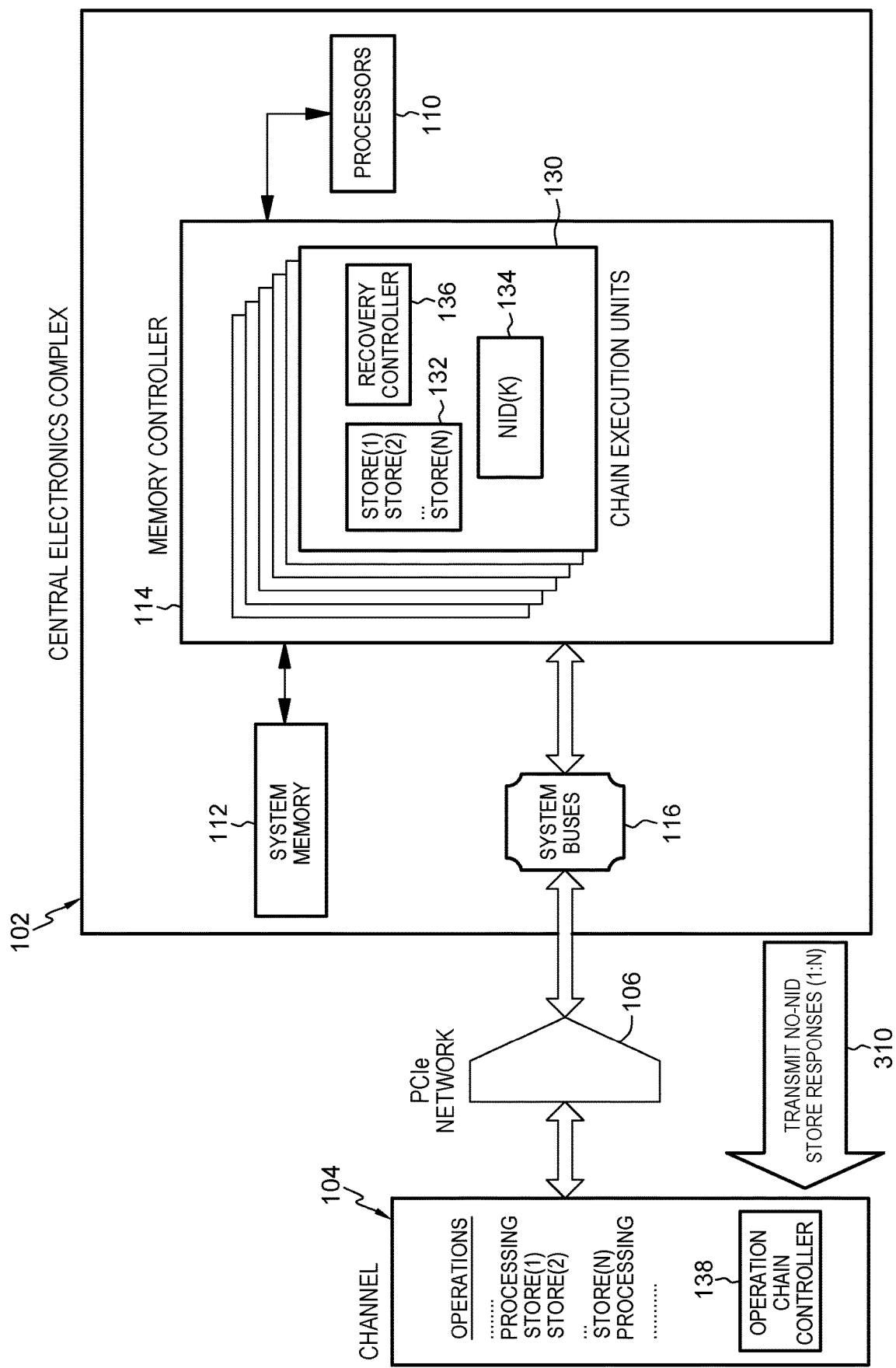
Figure 3D:
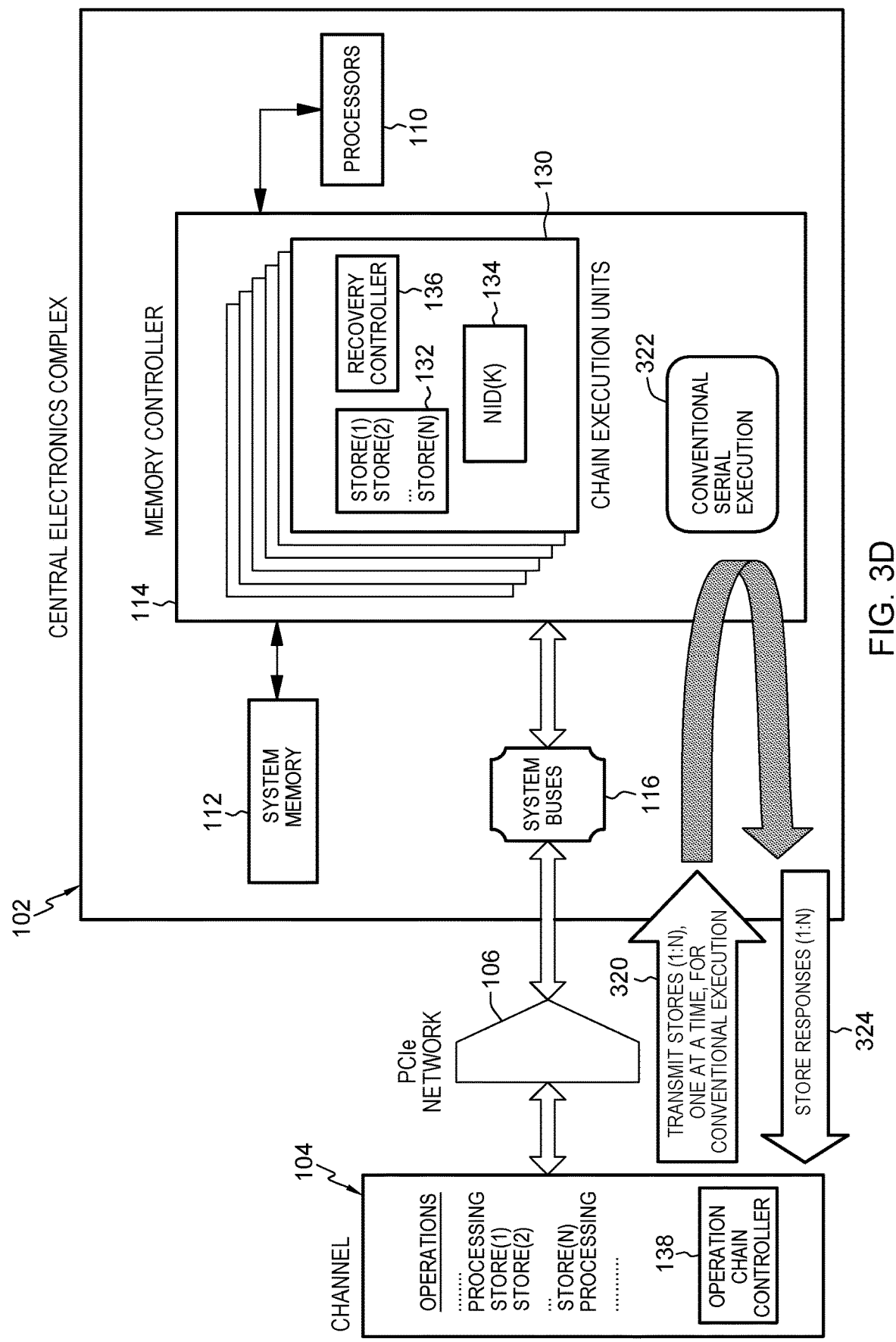

Referring to FIG. 3C, based on determining there is no available NID, in one example, a no-NID response 310 is transmitted from the memory controller (e.g., from the chain execution unit 130) back to the initiating channel 104 (e.g., to operation chain controller 138). Thus, in one example, as shown in FIG. 3D, the chained processing is automatically changed to unchained processing (e.g., the indicator used to specify chaining is reset (e.g., to zero)), and store operations 1 through N are re-transmitted 320 from channel 104 (e.g., from operation chain controller 138) to memory controller 114 via, e.g., network 106, one at a time, for conventional (i.e., unchained) execution. The memory controller receives the individual store operations, serially performs 322 the stores, and transmits 324 each response to the channel (e.g., operation chain controller 138). Since it is unchained execution, channel 104 waits for a response from one memory access operation of an I/O operation before sending the next memory access operation of the I/O operation.

In accordance with one or more aspects, chaining provides improved functionality for channels attached to processing systems via, e.g., PCIe buses and other system buses, which are capable of executing memory access operations. In one aspect, ordered sets of operations used within, for instance, the tunneled protocol are chained. A set of paired coordinated hardware elements is provided, in one example, in which one element of each pair of elements is in or close to an I/O channel (e.g., operation chain controller 138) and the other element of each pair is in or close to the host system memory controller (e.g., chain execution unit 130).

In one example, memory access operations are chained together and transmitted over a link to execute in local order with one another.

The channel element may initiate 'K' individual serialized memory access streams, each composed of 'N' individual memory access operations, which are transported to the element in the host system memory controller via the system buses.

Sets of 'N' memory access operations are identified which by their nature are to be serialized in execution with the communications protocol. In one example, a hardware element at the source of these operations in the I/O channel (e.g., operation chain controller 138) and a hardware element (e.g., chain execution unit) within the memory controller are implemented. These hardware elements are designed to cooperatively sequence through the passing of the 'N' selected serialized memory operations so that they are chained together to execute as one atomic set. In one example, the 'N' operations are coded with an identifier when transmitted from the channel, allowing the execution element in the memory controller to associate them in a chain. The hardware element in the system memory controller executes the 'N' serial memory access operations, one at a time, preparing responses back for each operation in it's turn. As examples, responses can be returned individually or coalesced into one combined response for the chained set.

In one or more embodiments, multiple channel sources for these chained operations could be simultaneously active to a single system memory controller. Thus, the system memory controller is to keep the operations from each channel's chain straight and distinct from each other. To keep these separate, each source channel is assigned a node identifier (NID).

In one aspect, the capability provides for individual sequenced execution of the serialized operations from the element in the system memory controller, and for executing many of these ordered sets of memory accesses operations simultaneously using unique NIDs to manage the individual sets distinctly from each other.

Further, in one aspect, a mechanism is provided to issue operations in the conventional non-chained manner when the set of available NIDs has been exhausted.

Yet further, in one aspect, a capability is provided for the channel to use currently unexploited bits within the PCIe header to communicate the intent to chain any operations together that has been so marked. Many variations exist.

In a further aspect, hardware failures may be detected, while the ordered sets are in process, returning failing and non-failing status to the individual operations as appropriate, and allowing the retry of the failing individual access operations as conventional individual non-chained operations. The failure of one operation may be isolated from the other chained sets. In one embodiment, the memory controller element decides whether a set of chained operations is to be failed simply on the basis of whether the operations failed to complete, and not as collateral damage when a failure of another set of chained operations is recovered.

In one aspect, the option of returning a single response for a full set of successfully executed chained operations is supported, in those cases where this is desired for improvements in transport path bandwidth and latency.

In one aspect, the initiating and executing of such chained sets of operations are provided, while also simultaneously executing conventional unchained operations that are completely ordered with operations from the same source, along with unchained operations from the same source that have no ordering restrictions at all.

Multiple I/O operations may be simultaneously initiated, and an order is specified for the memory accesses of the operations, which is encoded in, e.g., a hardware component residing much closer to system memory than the channel initiating the memory accesses.

The grouping and ordering of multiple I/O operations from the same process to any memory location are provided, in one aspect. The I/O operations may be to the same memory location or various memory locations.

One or more aspects of the present invention are inextricably tied to computer technology and facilitate processing within a computer, improving performance thereof. For instance, latency within I/O communications may be reduced, improving system performance. As a particular example, one or more aspects save transport time by allowing operations to be sent over the I/O (e.g., PCIe) link, rather than waiting for the round trip of a previous operation to complete; thus, overcoming an architectural restriction of a transport protocol, and saving time by getting the work closer to, e.g., memory faster, so that the memory access can proceed earlier.

One example of using aspects of the present invention is, as follows: An Open System Adapter (OSA) is an I/O channel providing local area network (LAN) connectivity in IBM Z. When an inbound I/O operation is completed, three simultaneous memory store operations are to be executed in sequence before the communications to the LAN completes—Store the SBAL (Storage Block Address List), Store the SLSB (Storage List Status Block Byte(s), and Store status in the SCB (SubChannel Bottom).

The round trip latency of each of these memory accesses through PCIe and other system buses is typically over 1 microsecond. Executing these operations as a chained set in the system memory, in effect, collapses 3 microseconds of round trips into just 1 microsecond of a single round trip, since execution is overlapped via chaining to hide the other 2 round trip travel times; thus, saving ⅔ of the communications time between the OSA channel and the memory controller.

Figure 4A:
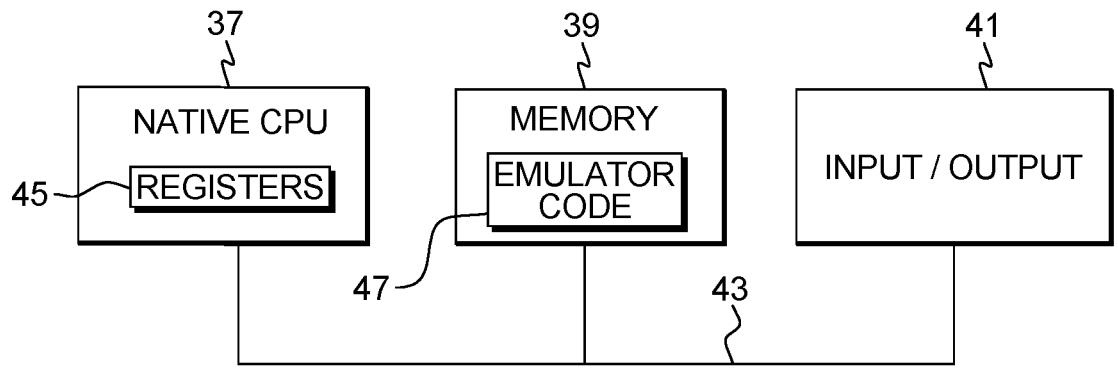
FIG. 4A depicts another example of a computing environment to incorporate and use one or more aspects of the present invention.

Other types of computing environments may also incorporate and use one or more aspects of the present invention, including, but not limited to, emulation environments, an example of which is described with reference to FIG. 4A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, N.Y.; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 4B:
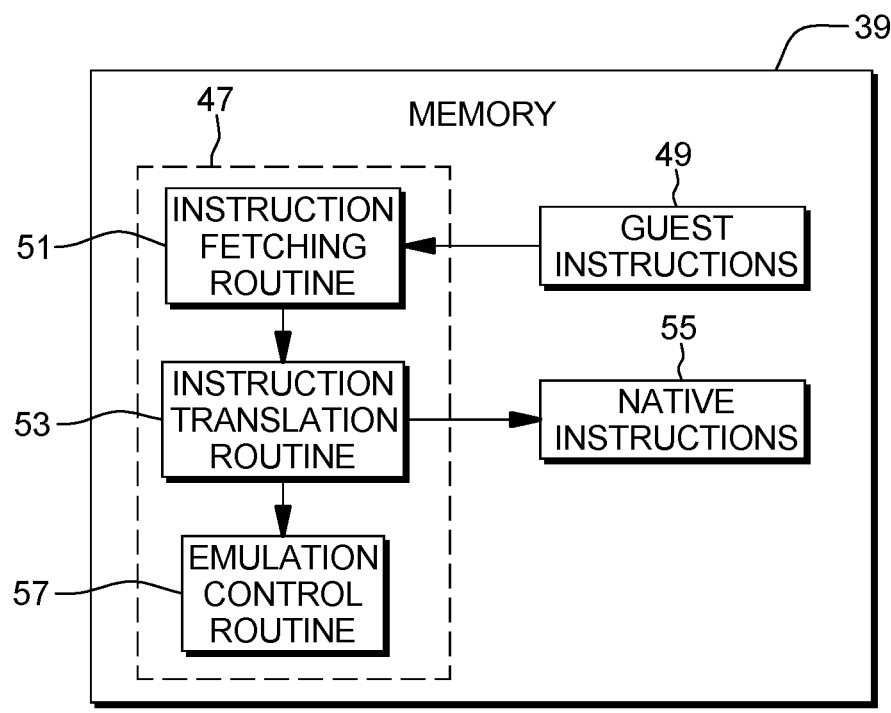
FIG. 4B depicts further details of the memory of FIG. 4A.

Further details relating to emulator code 47 are described with reference to FIG. 4B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
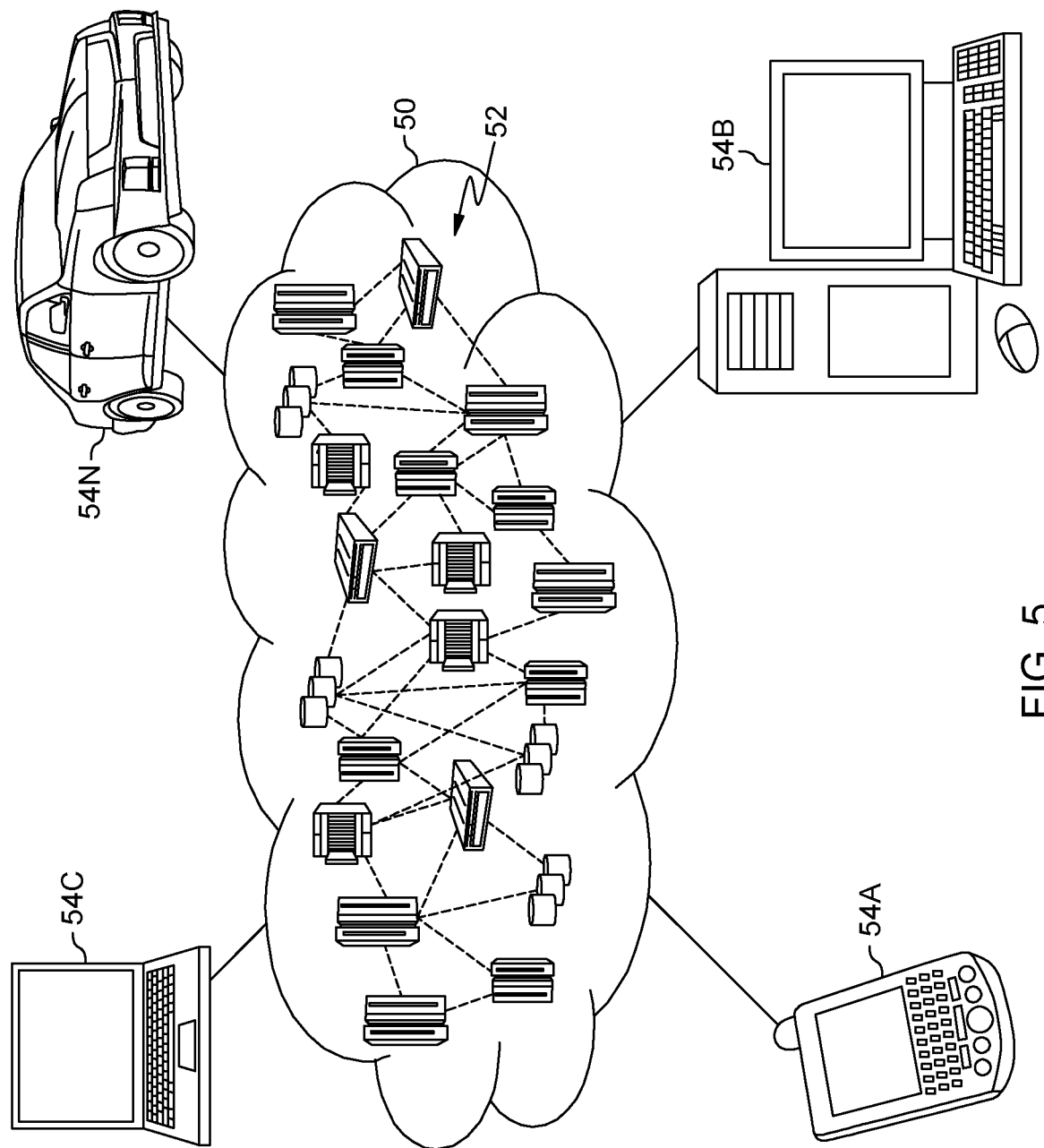
FIG. 5 depicts one embodiment of a cloud computing environment.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
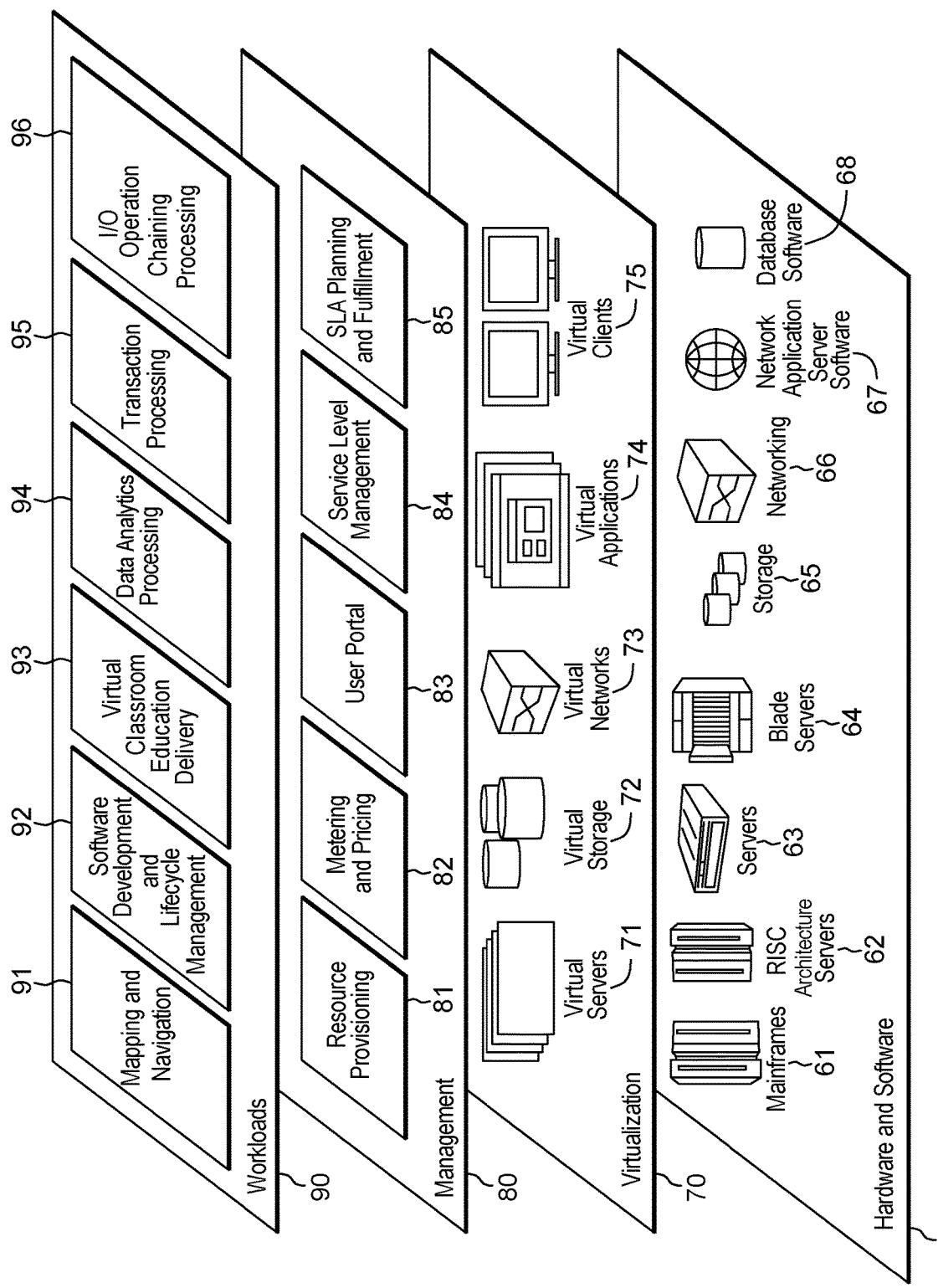
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and I/O operation chaining processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of I/O devices and/or networks may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for facilitating processing within a computing environment, the computer system comprising:
    a memory; and
    a memory controller in communication with the memory, wherein the computer system is configured to perform a method, said method comprising:
        obtaining, by the memory controller from an input/output (I/O) device coupled to the memory controller via an I/O network, the memory controller being external to the I/O network, a set of memory access operations, the set of memory access operations comprising a plurality of memory access operations to be chained, wherein the plurality of memory access operations are received as a group and are to be processed as an atomic unit;
        executing the plurality of memory access operations in a particular order; and
        providing one or more results of the set of memory access operations, wherein the I/O device is a channel and the I/O network comprises a Peripheral Component Interconnect express link.

2. The computer system of claim 1, wherein the obtaining comprises obtaining a plurality of sets of memory access operations, and wherein the executing comprises executing the plurality of memory access operations of the plurality of sets of memory access operations, wherein the plurality of memory access operations of each set of memory access operations are performed in order within the set of memory access operations.

3. The computer system of claim 2, wherein the executing the plurality of sets of memory access operations comprises simultaneously executing the plurality of sets of memory access operations.

4. The computer system of claim 1, wherein the providing comprises:
    coalescing a plurality of results from executing the plurality of memory access operations of the set of memory access operations into a single response; and
    providing the single response.

5. The computer system of claim 1, wherein the obtaining comprises obtaining the set of memory access operations from a channel, and wherein the executing comprises:
    determining whether there is a node identifier available for the channel from which the set of memory access operations is obtained; and
    performing the plurality of memory access operations, based on determining there is an available node identifier.

6. The computer system of claim 5, wherein the executing further comprises refraining from performing the plurality of memory access operations, based on determining there is no available node identifier.

7. The computer system of claim 1, wherein the executing comprises:
    determining an exception has occurred in performing a memory access operation of the plurality of memory access operations;
    providing a result that indicates the exception; and
    obtaining a re-transmission of the memory access operation as a single unchained operation.

8. The computer system of claim 1, wherein the method further comprises processing one or more additional individual memory access operations received from a same source from which the set of memory access operations was obtained.

9. The computer system of claim 1, wherein the set of memory access operations comprises a set of store operations to be performed in one or more locations of the memory.

10. A computer program product for facilitating processing within a computing environment, the computer program product comprising:
    a computer readable storage medium readable by a processing circuit and storing instructions for performing a method comprising:
        obtaining, by the memory controller from an input/output (I/O) device coupled to the memory controller via an I/O network, the memory controller being external to the I/O network, a set of memory access operations, the set of memory access operations comprising a plurality of memory access operations to be chained, wherein the plurality of memory access operations are received as a group and are to be processed as an atomic unit;
        executing the plurality of memory access operations in a particular order; and
        providing one or more results of the set of memory access operations, wherein the I/O device is a channel and the I/O network comprises a Peripheral Component Interconnect express link.

11. The computer program product of claim 10, wherein the obtaining comprises obtaining a plurality of sets of memory access operations, and wherein the executing comprises executing the plurality of memory access operations of the plurality of sets of memory access operations, wherein the plurality of memory access operations of each set of memory access operations are performed in order within the set of memory access operations.

12. The computer program product of claim 10, wherein the obtaining comprises obtaining the set of memory access operations from a channel, and wherein the executing comprises:
   determining whether there is a node identifier available for the channel from which the set of memory access operations is obtained; and
   performing the plurality of memory access operations, based on determining there is an available node identifier.

13. The computer program product of claim 10, wherein the executing comprises:
   determining an exception has occurred in performing a memory access operation of the plurality of memory access operations;
   providing a result that indicates the exception; and
   obtaining a re-transmission of the memory access operation as a single unchained operation.

14. The computer program product of claim 10, wherein the method further comprises processing one or more additional individual memory access operations received from a same source from which the set of memory access operations was obtained.

15. A computer-implemented method of facilitating processing within a computing environment, the computer-implemented method comprising:
   obtaining, by the memory controller from an input/output (I/O) device coupled to the memory controller via an I/O network, the memory controller being external to the I/O network, a set of memory access operations, the set of memory access operations comprising a plurality of memory access operations to be chained, wherein the plurality of memory access operations are received as a group and are to be processed as an atomic unit;
   executing the plurality of memory access operations in a particular order; and
   providing one or more results of the set of memory access operations, wherein the I/O device is a channel and the I/O network comprises a Peripheral Component Interconnect express link.

16. The computer-implemented method of claim 15, wherein the obtaining comprises obtaining a plurality of sets of memory access operations, and wherein the executing comprises executing the plurality of memory access operations of the plurality of sets of memory access operations, wherein the plurality of memory access operations of each set of memory access operations are performed in order within the set of memory access operations.

17. The computer-implemented method of claim 15, wherein the obtaining comprises obtaining the set of memory access operations from a channel, and wherein the executing comprises:
   determining whether there is a node identifier available for the channel from which the set of memory access operations is obtained; and
   performing the plurality of memory access operations, based on determining there is an available node identifier.

18. The computer-implemented method of claim 15, wherein the executing comprises:
   determining an exception has occurred in performing a memory access operation of the plurality of memory access operations;
   providing a result that indicates the exception; and
   obtaining a re-transmission of the memory access operation as a single unchained operation.

19. The computer-implemented method of claim 15, further comprising processing one or more additional individual memory access operations received from a same source from which the set of memory access operations was obtained.

* * * * *